(12) United States Patent
Shore et al.

(10) Patent No.: US 6,971,463 B2
(45) Date of Patent: Dec. 6, 2005

(54) ENERGY RECOVERY SYSTEM FOR WORK VEHICLE INCLUDING HYDRAULIC DRIVE CIRCUIT AND METHOD OF RECOVERING ENERGY

(75) Inventors: Daniel B. Shore, Prospect Heights, IL (US); Peter J. Dix, Naperville, IL (US)

(73) Assignee: CNH America LLC, New Holland, PA (US)

( * ) Notice: Subject to any disclaimer, the term of this patent is extended or adjusted under 35 U.S.C. 154(b) by 128 days.

(21) Appl. No.: 10/327,748

(22) Filed: Dec. 23, 2002

(65) Prior Publication Data

US 2004/0118623 A1    Jun. 24, 2004

(51) Int. Cl.[7] .................................................. B60K 6/00
(52) U.S. Cl. .................... 180/165; 180/69.6; 180/308
(58) Field of Search .............................. 180/165, 69.6, 180/307, 308, 65.4, 65.6; 60/408, 414, 416

(56) References Cited

U.S. PATENT DOCUMENTS

| 3,892,283 | A | * | 7/1975 | Johnson ...................... 180/165 |
| 4,240,515 | A | * | 12/1980 | Kirkwood .................... 180/165 |
| 4,679,396 | A | * | 7/1987 | Heggie ......................... 60/414 |
| 4,763,751 | A | * | 8/1988 | Gardner, Jr. ................ 180/305 |
| 5,971,092 | A | * | 10/1999 | Walker ........................ 180/308 |
| 6,170,587 | B1 | * | 1/2001 | Bullock ...................... 180/69.6 |
| 6,719,080 | B1 | * | 4/2004 | Gray, Jr. ..................... 180/165 |

* cited by examiner

*Primary Examiner*—Bryan Fischmann
*Assistant Examiner*—Kelly E. Campbell
(74) *Attorney, Agent, or Firm*—John William Stader

(57) ABSTRACT

A work vehicle having a hydrostatic drive system provides for the recovery and reuse of the vehicle's kinetic energy by conducting pressurized hydraulic fluid out of the hydrostatic drive system into an accumulator during vehicle deceleration, and conducting the pressurized fluid back into the drive system during vehicle acceleration to assist the vehicle's engine in accelerating the vehicle.

16 Claims, 7 Drawing Sheets

ENERGY RECOVERY SYSTEM FOR WORK VEHICLE INCLUDING HYDRAULIC DRIVE CIRCUIT AND METHOD OF RECOVERING ENERGY

FIELD OF THE INVENTION

The invention relates generally to propulsion systems for work vehicles. More particularly it relates to propulsion systems that regenerate energy.

BACKGROUND OF THE INVENTION

Work vehicles, such as skid steer loaders, bulldozers, backhoes, wheel loaders, graders, dump truck and the like often use hydraulic propulsion systems. In these systems, an internal combustion engine is coupled to a hydraulic pump to provide a source of hydraulic fluid under pressure.

The pressurized hydraulic fluid is conducted though hoses and tubing to a variety of actuators and motors to provide them with motive power. One or more of the motors may be connected to the drive wheels to drive the vehicle over the ground. Other actuator such as hydraulic cylinders may be used to move various implements or peripheral mechanisms.

By using hydraulic fluid as a source of power, the prohibitive cost of complicated gears, belts, transmissions, gearboxes, etc.—all otherwise necessary to drive the various devices from a single internal combustion engine—are avoided.

Some of these vehicles, such as wheel loaders and backhoes, engage in a great deal of start and stop motion. They typically travel short distances during a typical work cycle, starting, stopping, and reversing direction in just a few tens of feet.

Another characteristic of these vehicles is their low speed. Speeds from four to eight miles per hour while working at a common work site are typical.

A further characteristic is the short duration of the each work cycle and the number of work cycles per day. During an eight-hour shift, a loader may experience several hundred of these start/stop work cycles.

One problem with these vehicles is their fuel consumption. The repeated starting and stopping consumes a great deal of energy. Every few seconds during a typical work day the engine (together with the pump and drive motor or motors) is required to accelerate the vehicle from a dead stop to full speed, an then to decelerate to a full stop.

This type of motion dissipates a tremendous amount of energy as heat—typically by heating the hydraulic fluid and the hydraulic components that comprise the system. This, in turn, necessitates oil coolers for the hydraulic fluid to dump the heat and keep the fluid cool.

The need to accelerate rapidly many times each day also necessitates a larger engine than would otherwise be necessary. While the rapid accelerations require the engine to put out a quick burst of power, that same power is typically not required for moving the vehicle or operating its other actuators.

What is needed is some way to reduce the energy consumption of this work vehicle. What is also needed is some way of reducing power demands that make a smaller engine possible. Alternatively, what is needed is a system that provides a quick power boost when the vehicle accelerates both in forward and reverse directions.

All of these and other problems are alleviated by the invention described herein.

It is an object of this invention to provide a regenerating drive system that has the traditional internal combustion engine, but also has a secondary source of power for use during acceleration.

It is an object of this invention to provide a work vehicle with hydraulic motor-driven wheels or tracks that recoup a portion of the vehicle's kinetic energy otherwise dissipated as heat, and make it available to later drive the vehicle over the ground.

SUMMARY OF THE INVENTION

In accordance with a first embodiment of the invention, an energy-recovering hydraulic drive system for a work vehicle is provided, including an internal combustion engine, a hydrostatic ground drive circuit, a gas-charged hydraulic accumulator and a valve assembly that is coupled to and between the accumulator and the drive circuit. The valve assembly controls the flow of fluid between a motor and a pump in the drive circuit, alternately conducting some fluid out of the drive circuit to charge the accumulator, and conducting the fluid in the accumulator back into the hydrostatic drive circuit to help drive the motor.

In a regenerating mode, when the vehicle is decelerating, either backward or forward, the valve assembly directs fluid that is driven through the drive circuit by the motor (as it decelerates) into the accumulator if the accumulator needs to be charged.

In a static mode, when the vehicle is not moving over the ground, the valve assembly directs fluid from the pump to the accumulator if the accumulator needs to be charged.

In a drive mode, when the vehicle is accelerating either backward or forward, the valve assembly augments the pump power by adding fluid under pressure previously stored in the accumulator back into the hydrostatic drive circuit to assist the pump in driving the motor.

To volumetrically compensate the hydrostatic drive circuit for the removal of pressurized fluid used to charge the accumulator, or to compensate for the insertion of pressurized fluid back into the hydrostatic drive circuit from the accumulator, a charge pump with associated pressure relief valve coupled to the valve assembly may be provided. The pressure relief valve controls the outflow of fluid by maintaining a low head pressure, while permitting fluid to pass through to the reservoir, and the charge pump provides a low head pressure to the fluid that is sent from the reservoir to the hydrostatic. To the valve assembly, the two appear as a constant low-pressure source and sink.

The valve assembly includes at least two valves, one providing a fluid entrance into the drive circuit and one providing a fluid exit. One valve is coupled to either the supply or the return conduit, and the other valve is coupled to the other of the supply and return conduit. When the accumulator is assisting the pump by providing fluid to the drive circuit, fluid enters the circuit though one valve from the accumulator and exits the drive circuit by another valve. By "two valves" we do not imply that they are physically separate, since they may be provided as a single valve body, or as a portion of the pump or motor housings.

The two valves open at the same time, since fluid added to the hydrostatic drive circuit must be compensated for by the simultaneous removal of fluid from another portion of the circuit. In the preferred embodiment the two valves are incorporated into a single valve body, either Vf or Vr. The two valves are used when the vehicle is going forward or reverse.

A microprocessor-based controller monitors the various pressures in the drive circuit and the position of the operator hand controls that command the drive circuit, in order to determine when and how to open the valves in the valve assembly. Once it makes the determination that the valves should be opened or closed, it sends the appropriate signal to the valves of the valve assembly and they open responsively. When the microprocessor determines that different valve positions are more appropriate, it again signals the valves to open and close.

Other features and advantages of the present invention will become readily apparent from the following detailed description, appended drawings and accompanying claims.

Figure 1:
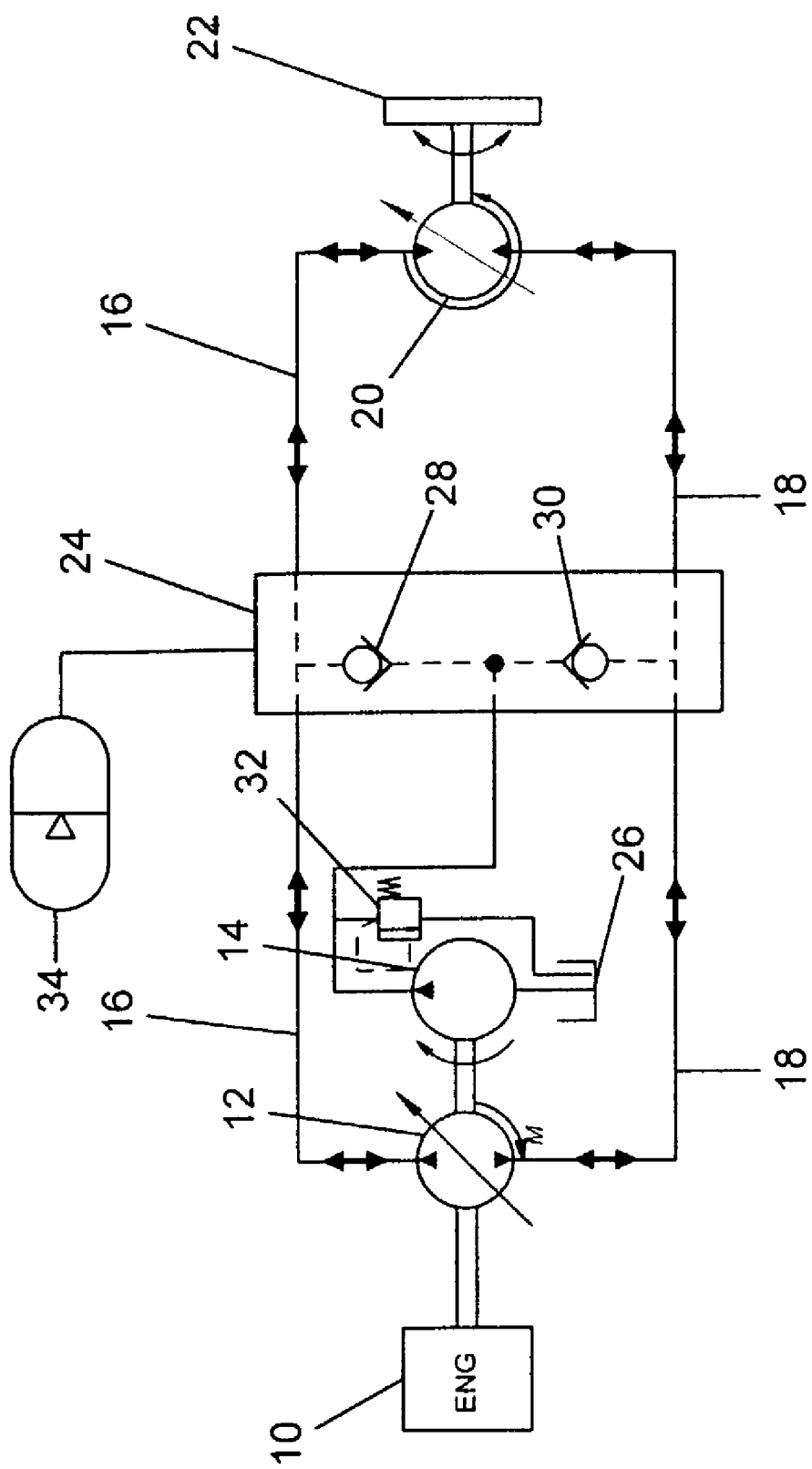
FIG. 1 illustrates a first embodiment of the invention showing a hydraulic drive pump and drive motor coupled together in a hydrostatic drive circuit. A valve assembly is in fluid communication with the drive pump and the drive motor to conduct fluid between the drive pump and the drive motor. In the illustrated configuration, the hydrostatic drive circuit is in a hydrostatic drive mode in which the vehicle's engine is driving a hydraulic motor coupled to a vehicle wheel. As the two-headed arrows indicate, the engine can drive the wheel in both directions, with fluid flowing clockwise and counterclockwise through the drive circuit between the pump and the motor.

Before explaining the preferred embodiment of the energy recovery system in detail, it is to be understood that the energy recovery system is not limited in the application to the details of construction and the arrangement of components set forth in the following description or as illustrated in the drawings. The energy recovery system is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to FIG. 1, a hydrostatic drive circuit is illustrated. The circuit is coupled to and driven by an engine 10, and, in turn, drives a vehicle wheel 22.

The basic elements of the drive circuit are a drive pump 12 that is fluidly coupled to drive motor 20 by two conduits 16 and 18. When engine 10 drives the drive pump 12, to which it is coupled, pump 12 produces hydraulic fluid under pressure. This pressurized fluid is conducted either into conduit 16 or conduit 18, depending upon the position of the swash plate of pump 12.

Since pump 12 provides both bidirectional and infinitely variable flow, it can direct pressurized fluid out of either port. Either port, in short can be an outlet or output port as well as an inlet or input port, depending upon the direction of pump flow. Similarly, drive motor 20 and wheel 22 rotate in either direction depending upon the direction of flow out of pump 12.

The drive circuit is hydrostatic, and contains a relatively constant volume of hydraulic fluid. Thus, the hydraulic fluid flow rate into and through drive motor 20 is equal to the fluid flow rate into and through pump 12. As the flow rate of pump 12 is changed the flow rate of motor 20 is changed equally as well. As a result, whenever the displacement or direction of flow of pump 12 changes, motor 20, (and wheel 22 to which it is drivingly coupled) speed up or slow down responsively.

The hydrostatic drive circuit also includes a valve assembly 24 that is fluidly coupled to both conduit 16 and conduit 18. This assembly (which may include one or more valves) controls the flow of hydraulic fluid through the conduits. There are several possible configurations for valve assembly 24, each configuration providing a different mode of operation. These different configurations are shown in FIGS. 1–6 and are described below.

In FIG. 1, valve assembly 24 is in a first configuration that provides a hydrostatic mode of operation for the drive circuit. In this mode, hydraulic fluid is conducted through the circuit in an endless loop from pump 12, through one of the conduits, through motor 20, back through the other conduit and then into pump 12, where the cycle repeats itself. All the power of the pump is transmitted to the motor to drive the wheel.

No hydraulic circuit is perfectly sealed, however. When hydraulic fluid leaks out it is replaced by hydraulic fluid from hydraulic fluid reservoir 26. A charge pump 14 is coupled to and driven by engine 10. Reservoir 26 is fluidly coupled to the suction side of the pump to provide it with hydraulic fluid. The pump supplies slightly pressurized hydraulic fluid at its outlets, which is coupled to both conduits 16 and 18 by check valves 28 and 30, respectively. As fluid leaks out of the hydrostatic drive circuit, it is automatically replaced by supplemental fluid from reservoir 26 via pump 14 and check valves 28 and 30. In this mode of operation, the fluid supplied by the charge pump is negligible.

The pressure provided by the charge pump is regulated by pressure regulating valve 32. Almost all of the fluid flow from the charge pump is dumped back to reservoir 26 via valve 32 during hydrostatic operation. This valve serves to keep a relatively constant low head pressure on both conduits, reducing the risk of cavitation and the replacement of hydraulic fluid by air drawn in from the atmosphere. The charge pump and pressure relief valve are not essential to the operation of the invention.

The remaining structure in FIG. 1 is hydraulic fluid accumulator 34. The accumulator is fluidly coupled to valve assembly 24 to receive hydraulic fluid under pressure from the assembly, which removes it from the hydrostatic drive circuit, and to introduce that pressurized fluid back into the hydraulic drive circuit through the valve assembly.

Figure 2:
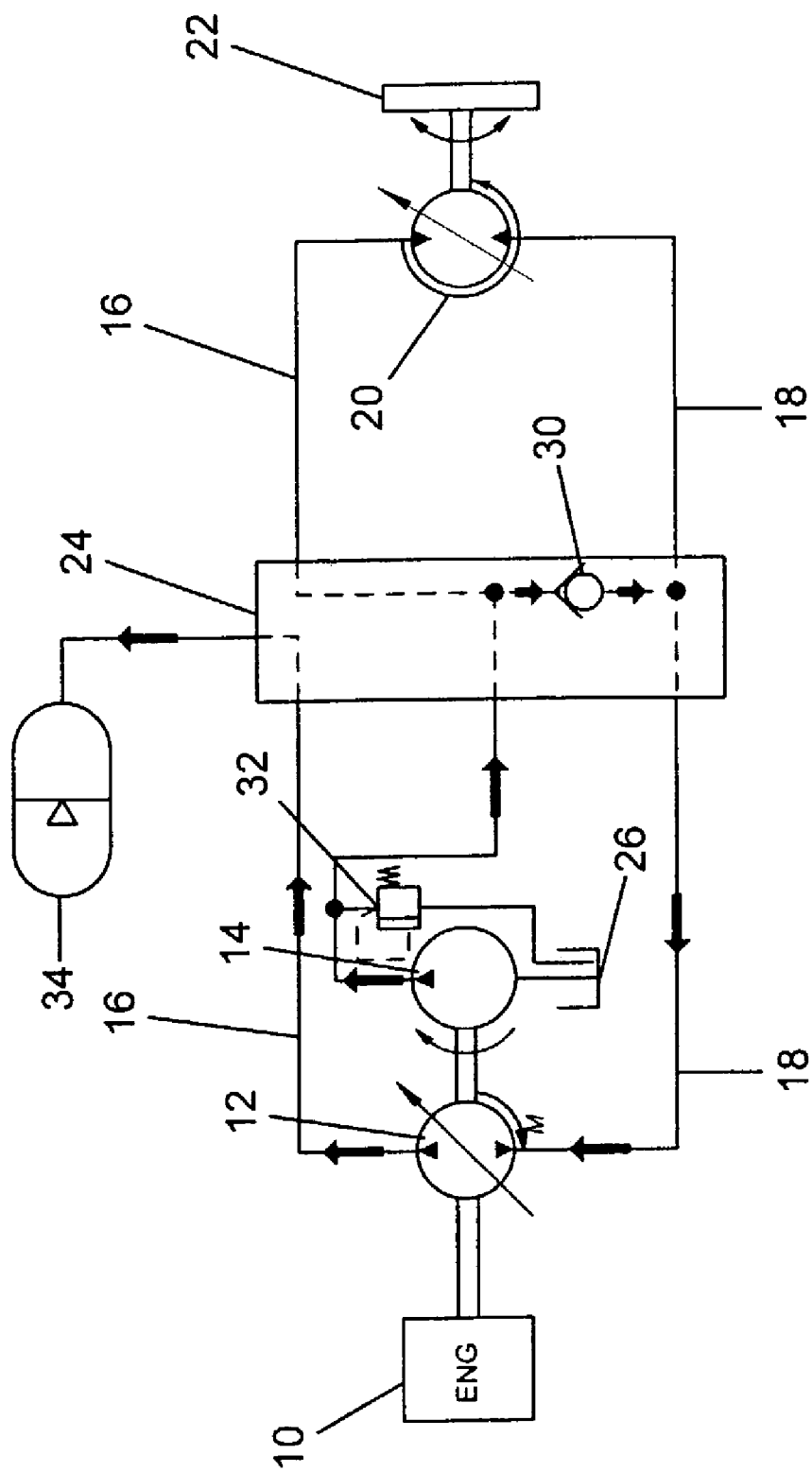
FIG. 2 illustrates the FIG. 1 embodiment in a second, energy storage mode of operation in which the valve assembly is configured to conduct pressurized fluid from the drive pump out of the hydrostatic drive circuit and into an accumulator, and to conduct fluid from a hydraulic fluid reservoir into the hydrostatic drive circuit to make up for the volume of pressurized fluid leaving the circuit and filling the accumulator. In this configuration, energy is not recovered, per se, but the accumulator is given an initial charge of pressurized fluid while the drive motor does not rotate.

FIG. 2 illustrates an energy storage mode of operation provided when the valve assembly is configured to conduct hydraulic fluid into the accumulator from the drive pump. Valve assembly 24 breaks the connection in the hydrostatic drive circuit between the pump and the motor by blocking fluid flow through conduit 16. In a similar fashion, valve assembly 24 breaks the connection between the motor and pump, thereby preventing the free flow of hydraulic fluid from the motor to the pump. The outlet of the pump—in this case the pump's upper port as shown in FIG. 2—is coupled to the accumulator, thus providing it with hydraulic fluid under pressure.

The inlet of the pump is coupled to reservoir 26 through valve assembly 24. This connection permits the inlet of the pump to receive hydraulic fluid from the reservoir, since its normal source of hydraulic fluid in the hydrostatic drive mode—the outlet of the motor, is disconnected from the inlet of the pump. It is the hydraulic fluid drawn from the reservoir that is pressurized and directed into the accumulator.

In this configuration the pump's outlet is disconnected from the motor inlet and the pump's inlet is disconnected from the motor outlet. No engine power is applied to the motor. This mode of operation and the corresponding configuration of the valve assembly are typically selected when the vehicle is stationary and the accumulator is not charged. It permits the accumulator to be charged without driving the motor, and therefore without the vehicle moving.

When the vehicle is stopped and the accumulator is charged in this configuration, there is no energy recovery per se, since the circuit does not serve to recover vehicle kinetic energy (energy of motion) and convert it into the potential energy of a charged accumulator. It merely couples the engine to the accumulator and uses engine power to charge the accumulator.

Figure 3:
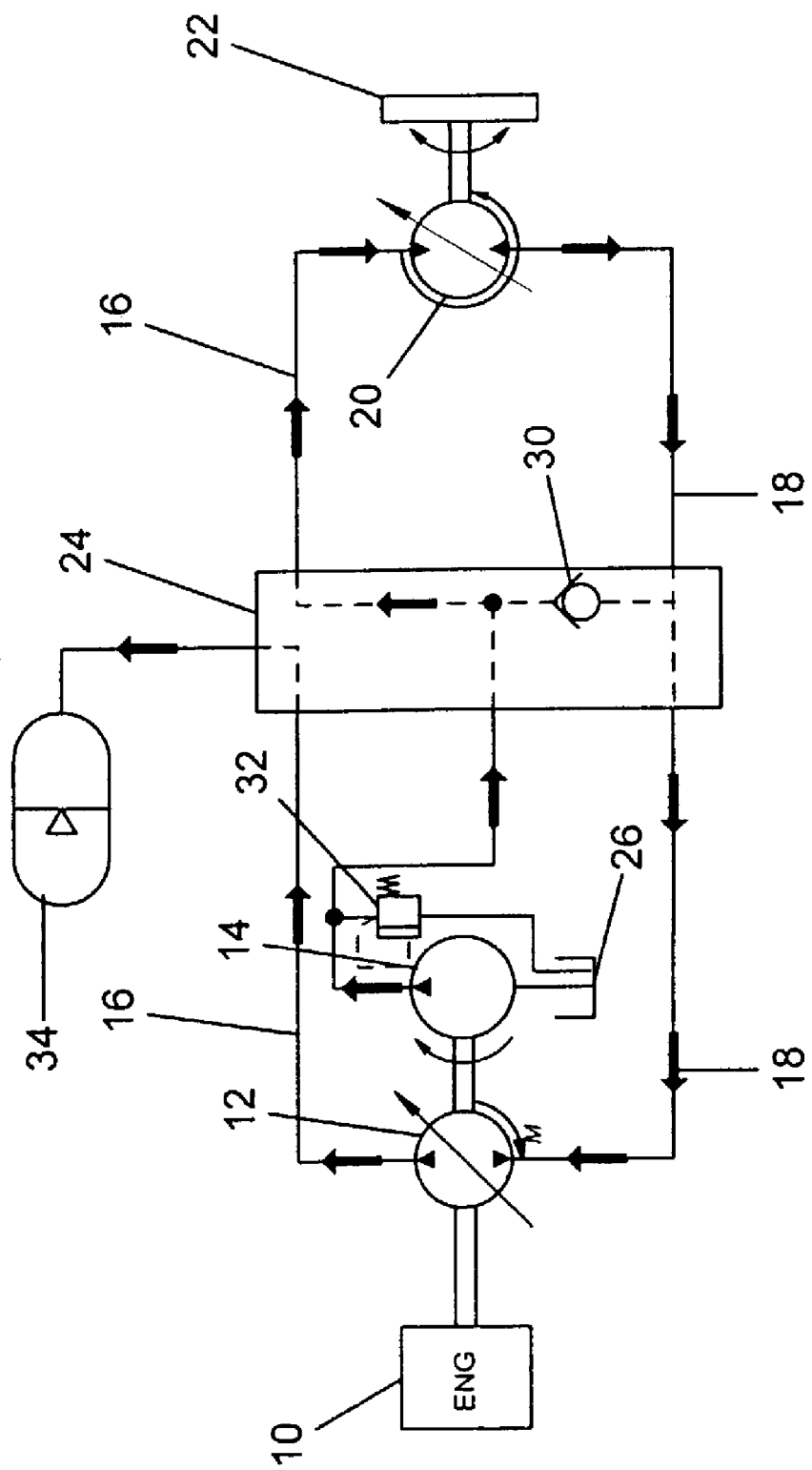
FIG. 3 illustrates the FIGS. 1 and 2 embodiments in a third energy recovery mode, in which the vehicle is traveling in a forward direction and decelerating. In this mode, hydraulic fluid pressurized by the drive motor as it decelerates is applied to the input side of the drive pump and is conducted through the drive pump and into the accumulator. In this configuration, the drive motor, acting as a pump, forces hydraulic fluid into the accumulator, thus recovering a portion of the vehicle's kinetic energy. The valve assembly simultaneously conducts makeup hydraulic fluid from the reservoir into the inlet side of the drive motor.

FIG. 3 illustrates the hydrostatic drive circuit in an energy recovery mode of operation. In this mode, the valve assembly 24 is configured in the same manner as it was configured in FIG. 2. In this mode however, the system recovers the vehicle's energy of motion and converts it into the potential energy of a charged accumulator.

The operator drives the vehicle over the ground in the hydrostatic mode of operation by placing the valve assembly in the configuration shown in FIG. 1, in which the pump and motor are fluidly coupled together as one continuous fluid flow loop, in which fluid pressurized by the pump is directed into the motor to drive it, and is then returned to the inlet of the pump.

Once the vehicle is traveling at the desired speed, the operator eventually slows the vehicle down. In the traditional configuration, the operator does this by reducing the displacement of the drive pump. If the pump displacement is reduced sufficiently, the pump and engine will actually slow the vehicle down. The reduced displacement of the pump will eventually reduce the flow of fluid through the drive motor and cause the motor to slow down. The vehicle's inertia tends to keep it moving, however, and this tendency to keep the vehicle moving appears as a higher pressure at the outlet side of the motor. The motor (actually the inertia of the vehicle) will drive fluid though the hydrostatic drive circuit.

The drive motor then begins to drive the pump. The engine slows the vehicle down and the motor speeds the engine up as the increased pressure at the pump inlet drives the pump. This is called dynamic braking. The same effect is experienced in an automobile when the driver takes his foot off the gas pedal. The engine slows the vehicle down.

During dynamic braking, the vehicle's energy of motion is converted into engine heat and is dissipated and wasted in the process. By placing the valve in the configuration shown in FIG. 3, however, some of this otherwise dissipated energy can be recovered during deceleration.

With the valve in the configuration shown in FIG. 3, the vehicle is moving forward (flow travels clockwise through the hydrostatic circuit) and the pump displacement has been reduced to the extent that the engine begins to dynamically brake the vehicle. During dynamic braking the pressure at the inlet side of the pump is greater that the pressure at the outlet side of the pump. The outlet side of the pump, however, has been coupled to the accumulator. This causes hydraulic fluid to begin charging the accumulator as the vehicle slows down, removing hydraulic fluid from the hydrostatic drive circuit. At the same time, the inlet of the motor has been connected to the reservoir 26 through the charge pump 14 and valve 24, thereby re-supplying hydraulic fluid to the hydrostatic drive circuit to make up for the fluid that is charging the accumulator.

The effect of this configuration is that the inertia of the vehicle pumps up the accumulator, thereby storing energy as hydraulic fluid under pressure in the accumulator rather than dissipating it in the engine as heat. A portion of the vehicle's energy of motion is thereby recovered during vehicle deceleration and is stored in the accumulator.

Figure 4:
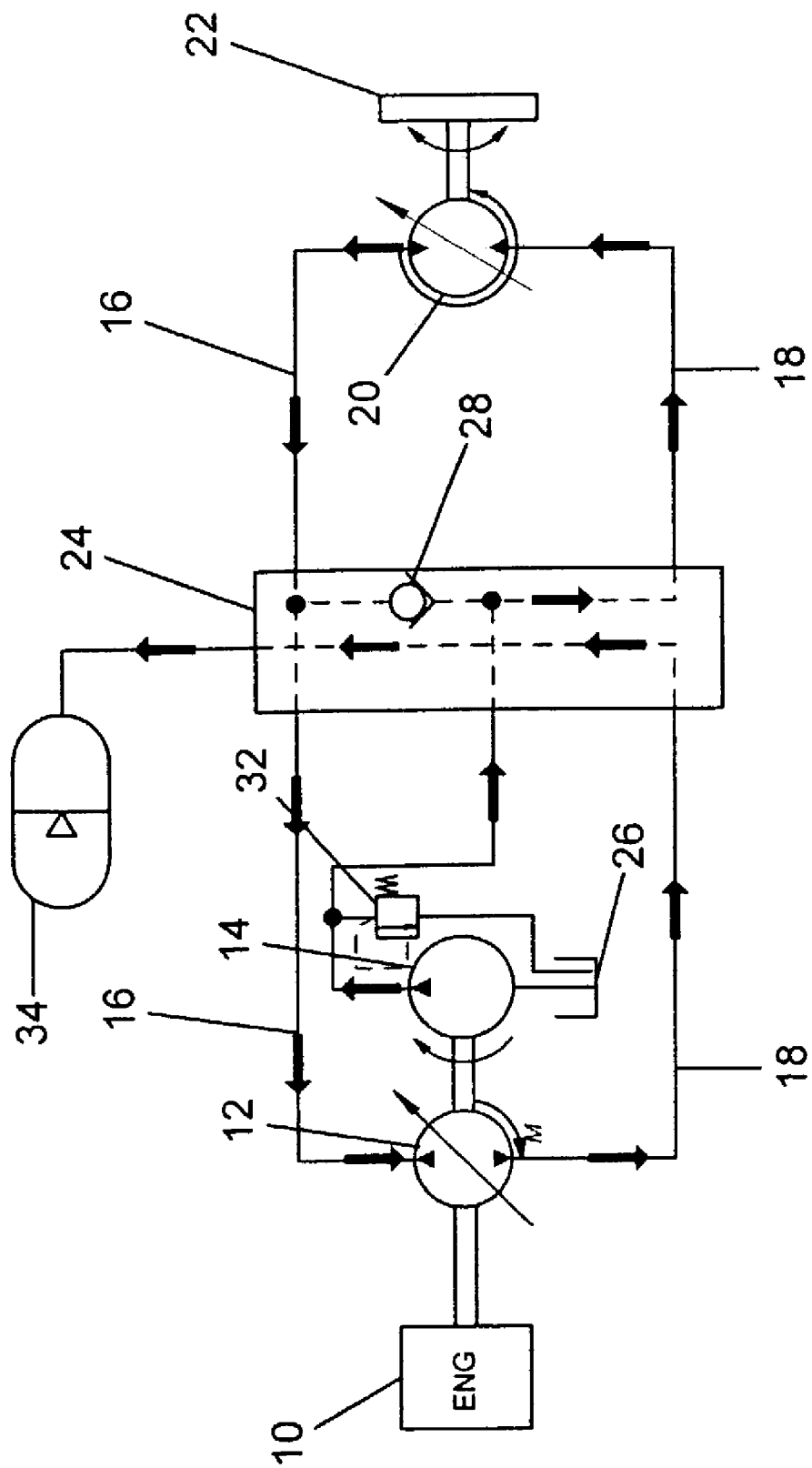
FIG. 4 illustrates the FIGS. 1–3 embodiment in a fourth energy recovery mode of operation in which the vehicle is traveling in a reverse direction and decelerating. In this mode, hydraulic fluid pressurized by the drive motor as it decelerates is applied to the input side of the drive pump and is conducted through the drive pump and into the accumulator. In this configuration, as in the configuration of FIG. 3, the drive motor, acting as a pump, forces hydraulic fluid into the accumulator, thus recovering a portion of the vehicle's kinetic energy. The valve assembly simultaneously conducts makeup hydraulic fluid from the reservoir into the inlet side of the drive motor.

FIG. 4 illustrates a second energy recovery mode of operation and a corresponding configuration of the valve assembly 24 that provides this recovery. The configuration of FIG. 4 illustrates how valve assembly 24 provides energy recovery when the vehicle is traveling in reverse (i.e. when there is counterclockwise flow through the hydrostatic drive circuit) and is decelerated. Note that valve assembly 24 and hydrostatic drive circuit configuration of FIG. 4 is a mirror image of the configuration of FIG. 3. In this configuration, the vehicle is moving in the reverse direction, as indicated by the reverse direction of flow through the hydrostatic drive circuit, and the operator has reduced the displacement of the drive pump 12. In this mode, the motor raises the pressure in conduit 16 as the pump displacement is reduced, and valve assembly 24 is configured to direct fluid from the outlet of the pump into accumulator 34. As in the example of FIG. 3, the motor thereby charges accumulator 34 as it slows down, recovering a portion of the energy that would otherwise be dissipated as heat in the engine. Thus, valve assembly 24 can be configured to recover energy both when the vehicle is decelerating while traveling in a forward direction (FIG. 3) and when the vehicle is decelerating when traveling in a reverse direction (FIG. 4).

Figure 5:
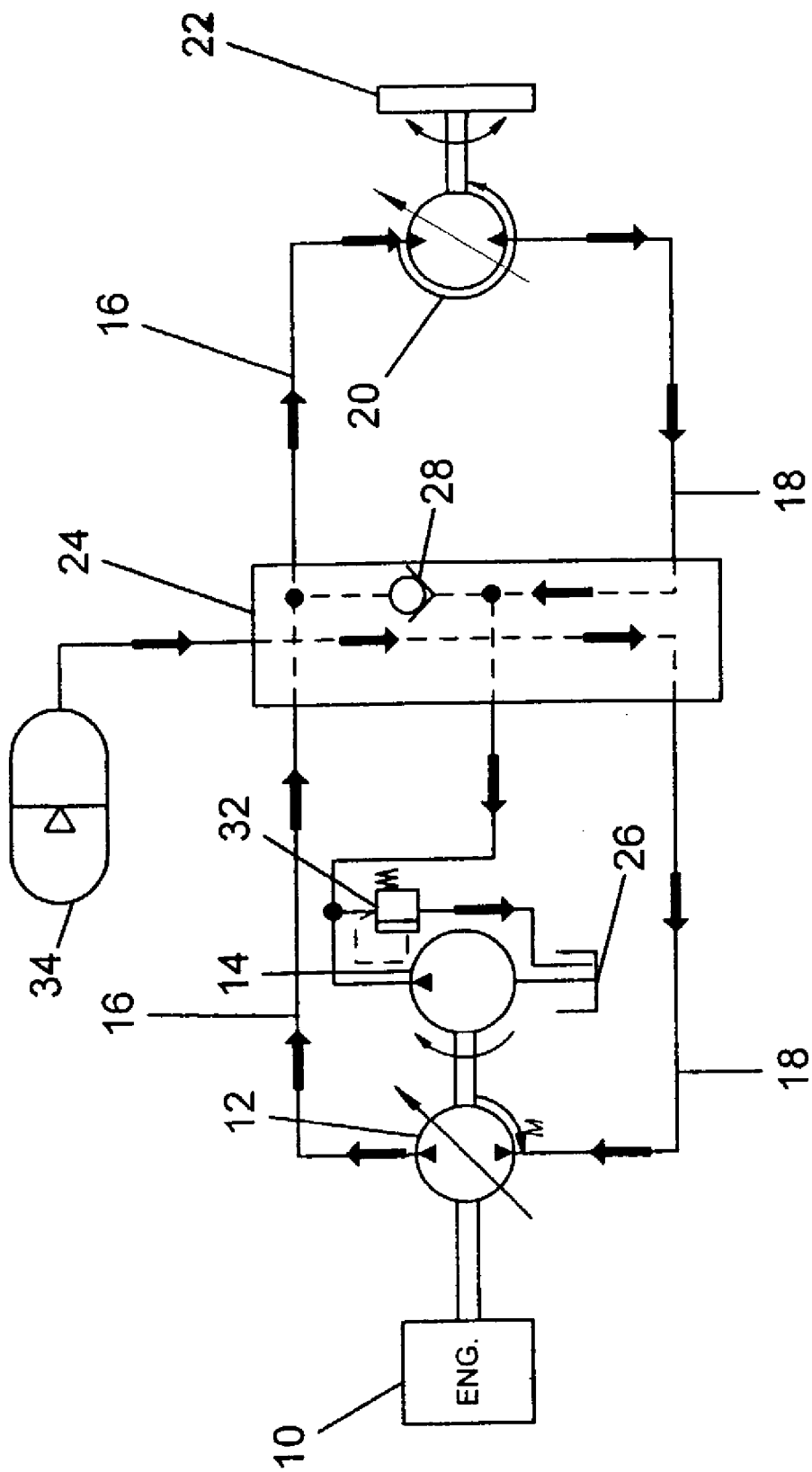
FIG. 5 illustrates a fifth, power boost, mode in which pressurized hydraulic fluid previously stored in the accumulator by any of the modes and configurations of FIGS. 2–4 is returned to the hydrostatic drive circuit to assist the drive pump in driving the drive motor in a forward direction. In this configuration, the valve assembly conducts pressurized hydraulic fluid from the accumulator into the hydrostatic drive circuit and conducts non-pressurized fluid out of the hydrostatic drive circuit and into the reservoir to accommodate the addition of pressurized hydraulic fluid to the drive circuit. The pressurized hydraulic fluid is conducted to the inlet side of the drive pump, reducing the pressure drop across the pump, and assisting the drive pump in driving the drive motor in a forward direction.

FIG. 5 illustrates a first energy boost mode of operation of the hydrostatic drive circuit. As described above, valve assembly 24 is configured to direct fluid to store a portion of the vehicle's energy of motion, both forward-moving energy and reverse-moving energy, in accumulator 34. This storage, however, is of little benefit unless it can be used productively to assist the engine in driving the vehicle over the ground.

FIG. 5 illustrates how the hydrostatic drive circuit and valve assembly 24 in particular can be configured to use this energy to assist the engine in driving the vehicle in a forward (i.e. clockwise flow) direction.

In FIG. 5, valve assembly 24 is configured to couple accumulator 34 to the inlet side of drive pump 12. Since accumulator 34 is charged at this time, this coupling increases the pressure on the inlet side of drive pump 12. This reduces the pressure difference across the pump and therefore reduces the amount of work the pump must do to provide a desired flow rate through and head pressure on the drive motor 20. The accumulator figuratively gives the motor a "push" to assist it as it drives drive motor 20.

This process reintroduces hydraulic fluid into the drive circuit. To compensate for this additional fluid from the accumulator, valve assembly 24 interrupts flow through conduit 18 and directs fluid leaving the outlet of drive motor 20 back to the reservoir through pressure regulating valve 32. As a result, the fluid in the drive circuit is maintained constant. In this manner, the fluid in the accumulator, whether introduced while the vehicle was traveling forward or in reverse, is used to assist the engine in driving the vehicle over the ground.

Figure 6:
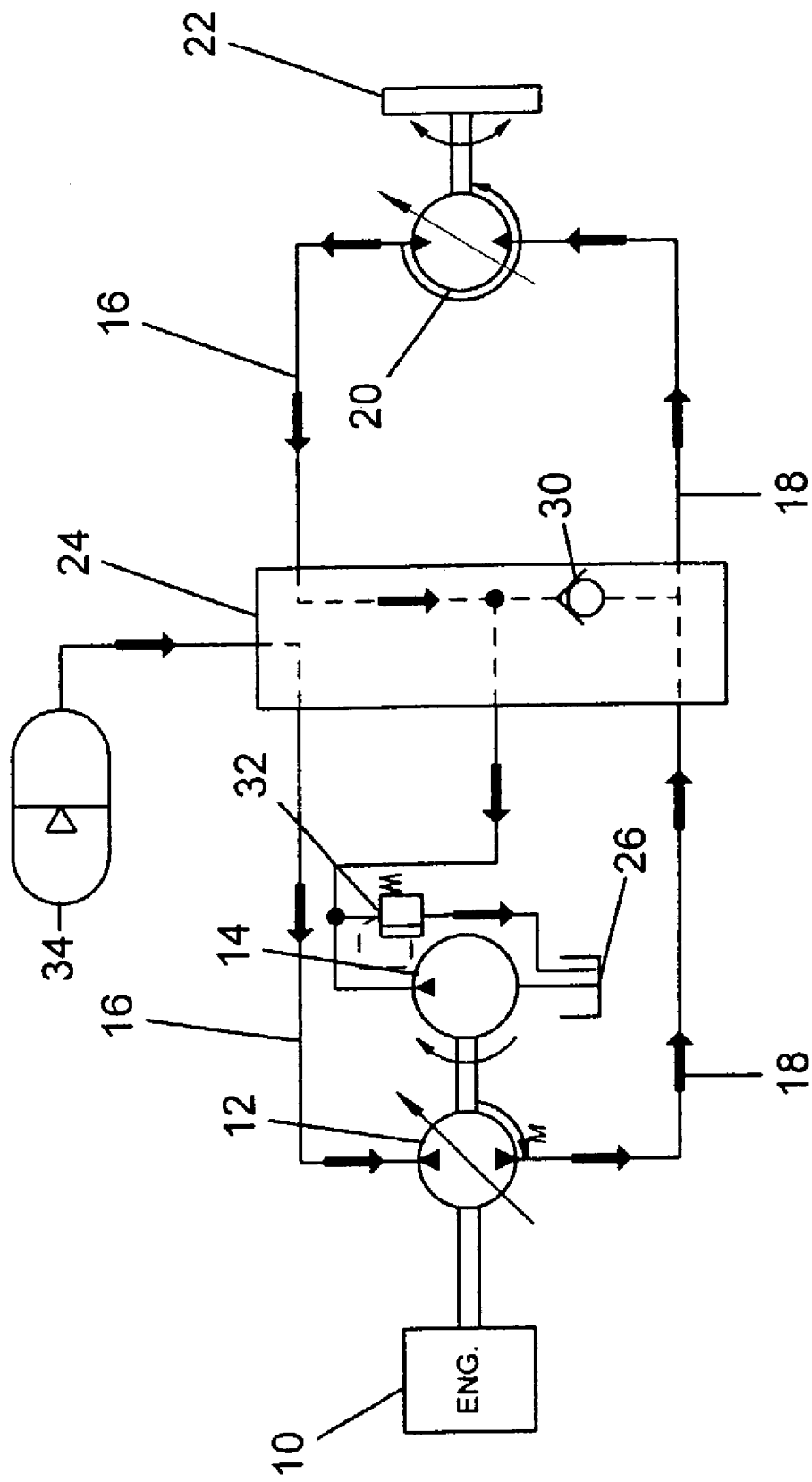
FIG. 6 illustrates a sixth, power boost, mode in which pressurized hydraulic fluid previously stored in the accumulator by any of the modes and configurations of FIGS. 2–4 is returned to the hydrostatic drive circuit to assist the drive pump in driving the drive motor in a reverse direction. In this configuration, the valve assembly conducts pressurized hydraulic fluid from the accumulator into the hydrostatic drive circuit and conducts non-pressurized fluid out of the hydrostatic drive circuit and into the reservoir to accommodate the addition of pressurized hydraulic fluid to the drive circuit. The pressurized hydraulic fluid is conducted to the inlet side of the drive pump, reducing the pressure drop across the pump, and assisting the drive pump in driving the drive motor in a reverse direction.

FIG. 6 illustrates a second energy boost mode of operation with the valve assembly in a mirror image configuration as that shown in FIG. 5. This configuration of valve assembly 24 is provided whenever the vehicle is traveling in reverse (i.e. counterclockwise flow), the accumulator is charged with fluid, and the operator desires a boost of power to assist the engine in driving the vehicle.

From the foregoing FIGURES and associated descriptions it should be clear that valve assembly 24 functions to recover a portion of the vehicle's energy of motion and store that energy as pressurized hydraulic fluid in an accumulator. It should also be clear that it also functions to use this previously stored energy to assist the engine in driving the vehicle over the ground in a different configuration. It is preferable that the valve assembly be configured to recover energy of vehicle motion both in a forward and in a reverse direction, and that it be configured to assist or boost the engine both in a reverse and in a forward direction. It is also preferable that the valve is configured to permit energy stored while the vehicle is traveling in one direction (either forward or reverse) to be used to boost vehicle motion in either direction (either forward or reverse).

Figure 7:
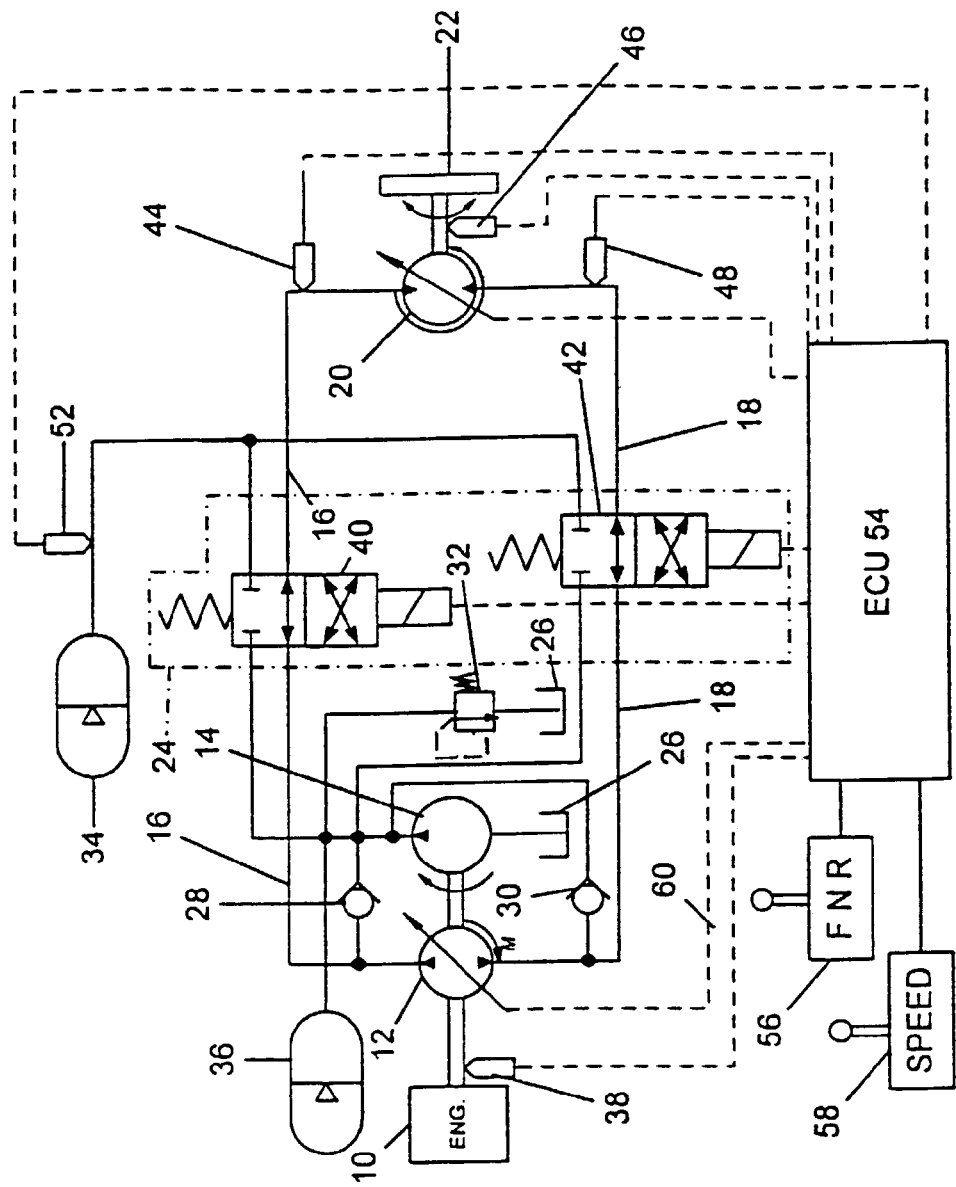
FIG. 7 illustrates another embodiment of the valve assembly, the hydrostatic drive circuit, and the accumulator of FIGS. 1–6 having the same capabilities and modes of operation as disclosed in FIGS. 1–6 as well as a second accumulator. The valve assembly of FIG. 7 includes two spool valves and two check valves configured to function in the same manner as the valve assembly of FIGS. 1–6, as well as an electronic controller coupled to the valves and to the conduits of the hydrostatic drive circuit to automatically control their opening and closing, thereby automatically providing the modes of operation and configurations of FIGS. 1–6 without requiring operator intervention.

FIG. 7 shows an alternative and more detailed embodiment of the hydrostatic drive circuit of the foregoing FIGURES showing a preferred construction of valve assembly 24, as well as a preferred method and apparatus for configuring the valve assembly 24 in an automatic manner that does not require constant operator intervention and adjustment.

There are several structures illustrated in FIG. 7 that have been added to the circuit shown above in FIGS. 1–6. In particular, a second accumulator 36 has been fluidly coupled to the output of charge pump 14. Accumulator 36 has been found beneficial in providing a reservoir of hydraulic fluid to be used as makeup fluid whenever fluid is introduced into accumulator 32 as described above in conjunction with the discussion of FIGS. 1–6. By providing this additional reservoir of fluid, a smaller charge pump and small pressure can be used to achieve the preferred small head pressure generated by charge pump 14. When rapid flows either into reservoir 26 or out of reservoir 26 are required, the additional reservoir of fluid can be used to either supplement or absorb the charge pump and regulating valve 32.

Two speed sensors 38 and 46 are provided to generate electrical signals indicative of the pump and the motor speed, respectively. These sensors are preferably coupled to the shafts of the pump and motor, respectively.

Three pressure sensors 44, 48 and 52 are provided to generate electrical signals indicative of the hydraulic fluid pressure in (1) the forward inlet (and reverse outlet) port of motor 20, (2) the forward outlet (and reverse inlet) port of motor 20, and (3) accumulator 34, respectively. These sensors are preferably fluidly coupled to conduit 16, conduit 18 and accumulator 34, respectively.

A manual forward/neutral/reverse (FNR) operator control 56 is provided by which the operator selects a forward, neutral or reverse direction of vehicle travel is provided. This control generates an electrical signal indicative of the operator's desired direction of travel when the operator manipulates it.

A manual speed control 58 is provided by which the operator selects a desired speed of vehicle motion. This control generates an electrical signal indicative of the desired speed of vehicle travel when the operator manipulates it.

Drive pump 12 and drive motor 20 preferably have an electronically controllable swash plate to permit the displacement and the direction of flow to be selected by the application of electrical signals to them.

The final additional structure is an electronic control unit or ECU 54. This controller is coupled to the operator controls to receive and respond to operator commands indicative of the desired vehicle speed and vehicle travel direction. It is coupled to the sensors to receive and respond to the hydraulic fluid pressure provided by those sensors. It is coupled to the pump and motor to vary their displacement and direction of flow.

The ECU is a microprocessor-based controller having a digital microprocessor, RAM, ROM, signal conditioning and driver circuitry of conventional design. It controls the operation of valve assembly 24 to place the vehicle in hydrostatic drive mode as described above with regard to FIG. 1, to initially charge accumulator 34 as described above with regard to FIG. 2, to recover energy as described above with regard to FIGS. 3 and 4, and to assist the engine in energy boost mode described above with regard to FIGS. 5 and 6.

It does this by energizing and de-energizing valves 40 and 42 of preferred valve assembly 24 shown in FIG. 7 in response to the signals it receives from the operator and the sensors.

Initially, the accumulator is empty (not charged and therefore at a low pressure as indicated by sensor 52), the vehicle is not moving (the motor is not moving as indicated by sensor 46), and the operator is not commanding forward or reverse motion (as indicated by operator controls 56 and 58). When ECU 54 determines that this state exists as indicated by the sensor and controls, it energizes valve 40, causing valve assembly 24 to be configured as shown in FIG. 2. ECU 54 simultaneously commands drive pump 12 to a positive displacement in which hydraulic fluid is pumped out of the upper port of drive pump 12 and into accumulator 34, as shown in FIG. 2. In this manner, the ECU initially charges the accumulator for use while the operator is not commanding forward motion or reverse motion of the vehicle.

When the accumulator is fully charged, ECU 54 de-energizes valve 40 and simultaneously commands the displacement of drive pump 12 to zero. Thus the vehicle remains at rest with the accumulator charged and the accumulator-charging load taken off the engine. Valve assembly 24 is in the configuration shown in FIG. 1, but with a pump displacement of zero, not rotating the wheel and the vehicle stationary, but with a fully charged accumulator 34.

The vehicle remains in this state until the operator manipulates controls 56 and 58 to command vehicle motion in a forward or reverse direction at a particular speed. When the operator requests forward or reverse motion, for example, by moving the FNR lever to the "forward" or "reverse" positions, and when the operator selects a greater than zero, ECU 54 commands valve assembly 24 to a first power boost mode, in which pressurized hydraulic fluid in the accumulator is applied to the inlet port of drive pump 12. As described above, the inlet port is the lower pump port when the vehicle is commanded to move in the forward direction, and is the upper pump port when the vehicle is commanded to move in the reverse direction.

When the operator-selected direction is forward, the ECU energizes valve 42, thereby configuring valve assembly 24 as shown in FIG. 5. This configuration couples the accumulator to the lower, inlet port of pump 12 and couples the lower, outlet port of motor 20 to reservoir 26. The accumulator assists the pump in accelerating the vehicle in a forward direction. ECU 54 also commands the drive pump to increase its displacement to conduct the accumulator fluid to the motor through conduit 16.

As the vehicle moves faster, the accumulator loses its charge as it empties and its fluid is reintroduced into the hydrostatic drive circuit to drive the motor. When it is empty, ECU 54 removes it from the circuit. Once ECU 54 determines that the accumulator pressure has dropped to an appropriately low level (i.e. the accumulator is effectively without a charge), ECU 54 de-energizes valve 42. At this point, the valve assembly 24 is in the configuration shown in FIG. 1 and the hydrostatic drive circuit is in the closed loop hydrostatic drive mode with a positive forward pump displacement and with the engine driving the vehicle by itself.

Eventually the operator dynamically brakes the vehicle. ECU 54 is configured to automatically change the configuration of valve assembly 24 to recover the kinetic energy of the vehicle. As mentioned above in conjunction with FIGS. 2 and 3, dynamic braking exists when the engine absorbs the kinetic energy of the vehicle and slows the vehicle down. The operator signals his desired deceleration by moving the speed lever to a lower speed setting (or zero speed) or by reversing the direction of travel from forward to reverse or vice versa. When ECU 54 receives a signal indicating a command to decelerate from operator controls 56 and 58, it responsively reduces the hydraulic fluid flow rate through pump 12 by commanding a reduced pump displacement. ECU 54 also energizes one of valves 40 and 42 depending upon the direction the vehicle is traveling in.

When the vehicle is traveling in a forward direction, ECU energizes valve 40, thereby blocking hydraulic fluid flow from the pump outlet to the motor inlet and directing hydraulic fluid from the upper, pump outlet port into accumulator 34 as shown in FIG. 3. Valve 40 simultaneously couples the inlet of drive motor 20 to reservoir 26 via charge pump 14. This permits makeup hydraulic fluid to enter the hydrostatic drive circuit making up for the volume of fluid entering accumulator 34.

When the vehicle is traveling in the reverse direction, ECU energizes valve 42, configuring it in the manner depicted in FIG. 4. This blocks hydraulic fluid flow from the pump outlet to the motor inlet and directs hydraulic fluid from the lower, pump outlet port into accumulator 34. Valve 42 simultaneously couples the inlet of drive motor 20 to reservoir 26 via charge pump 14.

ECU 54 is configured to monitor the accumulator pressure by reading sensor 52 and to automatically de-energize valves 40 and 42 once the accumulator is charged (i.e. pressurized) to a predetermined level, as indicated by the sensor 52. Once the pressure reaches this level, ECU 54 de-energizes valves 40 and 42, thereby reconfiguring valve assembly 24 to the configuration shown in FIG. 1.

In the preferred embodiment, ECU 54 therefore automatically switches from mode to mode and from valve configuration to valve configuration based upon operator command signals. These signals indicate to the ECU whether the vehicle is accelerating (or alternatively, has been commanded to accelerate) or is decelerating (or has been commanded to decelerate).

The ECU need not monitor the operator controls, however, but may monitor other controls and sensors that indicate vehicle acceleration or deceleration. For example, by monitoring the motor rotational speed alone, ECU 54 can differentiate the speed signal and determine whether the vehicle is speeding up (accelerating) or is slowing down (decelerating). If it is decelerating, the ECU can reconfigure the valve to recovery energy as shown in FIGS. 3 and 4, depending upon the direction of deceleration. The same speed signal will in the same manner indicate vehicle acceleration if the vehicle is accelerating. ECU 54 can responsively reconfigure valve assembly 24 to boost the power of the engine as shown in FIGS. 5 and 6.

Alternatively, the ECU can monitor the direction of rotation of motor 20 using speed sensor 46 and pressure sensors 44 and 48 to do the same. An appropriate speed sensor 46 indicates to the ECU the direction of rotation of motor 20, and hence which motor port is an inlet and which motor port is an outlet. Given this knowledge, ECU 54 can compare the pressures at the inlet and outlet ports (from pressure sensors 44 and 48) to determine which one is higher. If the pressure at the inlet port of motor 20 is higher than the pressure at the outlet port, the motor is being driven by the pump, and ECU 54 can reconfigure valve assembly to an energy boost mode in which the accumulator assists the engine as shown in FIGS. 5 and 6. If the ECU determines that the motor outlet pressure is higher than the inlet pressure, the vehicle is decelerating and the ECU can reconfigure valve assembly 24 to the energy recovery configuration shown in FIGS. 3 and 4. Alternatively, the direction of travel can be indicated by the FNR lever, and the acceleration and deceleration determined from the pressure sensors.

From the description above, it should be clear that the vehicle, when traveling in a forward direction can decelerate and charge the accumulator. Should the vehicle next accelerate in forward, the charged accumulator would be used to boost the energy provided by the engine to accelerate the vehicle in the same (i.e. forward) direction. Alternatively, should the vehicle stop moving forward and begin to accelerate in reverse, the charged accumulator will be used to boost the energy provided by the engine by accelerating the vehicle in the opposite direction (i.e. reverse), Similarly, the vehicle, when traveling in a reverse direction, can decelerate and charge the accumulator. Should the operator then accelerate the vehicle in reverse, the charged accumulator will be used to accelerate the vehicle in the same (reverse) direction. Alternatively, if the vehicle comes to a stop and the operator accelerates the vehicle in the opposite (i.e. forward) direction, the accumulator will be used to boost the energy provided by the engine by accelerating the vehicle in the forward (i.e. opposite) direction.

In sum, whether going forward or in reverse, the system can recover the vehicle's energy of motion. Whether the vehicle accelerates in the same direction or in the opposite direction, the recovered energy of motion can be used to boost the vehicle's speed.

This capability is particularly valuable in vehicles such as front wheel loaders, backhoes, or skid steer vehicles that typically move in back-and-forth patterns of motion. For example, a front wheel loader will go forward to drive an implement, such as a loader bucket, into a pile of material. It will then raise the bucket in the air. It then reverses direction and accelerates in reverse. Once it has backed up a convenient distance, it decelerates in reverse, stops, and swivels in place. Pointing in the new direction, it accelerates in a forward direction and approaches another pile or a vehicle such as a dump truck, for example, and decelerates in forward. It then dumps the bucket. Once the bucket is dumped, the loader reverses direction and accelerates in reverse. It then decelerates to a stop and changes direction. It then accelerates back toward the pile of material and repeats the cycle.

The embodiment described above, permits the operator to store energy during deceleration in one direction (both forward and reverse) and to use that energy on the very next acceleration in the opposite direction.

Thus, it should be apparent that it has been provided in accordance with the present invention energy recovery system in which an accumulator stores the energy of motion of a vehicle during vehicle deceleration has been disclosed. Although the invention has been described in conjunction with specific embodiments thereof, it is evident that many alternatives, modifications, and variations will be apparent to those ordinarily skilled in the art. For example, the valve assembly can be made of a single valve or multiple valves. The valves that comprise the valve assembly can be of any conventional design or arrangement used for conducting and controlling hydraulic fluid. It is also contemplated that the valve assembly may be manually operable as well as electronically operable as described in conjunction with FIG. 7. In embodiments of the invention having an ECU, one or more processors may provide the control functions provided by the ECU. The ECU need not vary the pump displacement described above. Since the pump displacement changes are more appropriately considered a part of the vehicle's drive control system they may be performed by a different controller. The ECU can determine whether energy should be recovered or the power of the motor boosted based on a variety of criteria that may be derived from hydraulic fluid pressure signals, valve displacement signals, and operator control signals. The drive motor need not be directly coupled to a wheel, but may have one or more gear trains disposed between and coupling the motor and the wheel. Although the system shows a single drive pump coupled to a single drive motor, there may be two or more motors driven by a single drive pump in series with one another or in parallel with one another. Accordingly, it is intended to embrace all such alternatives, modifications and variations that fall within the spirit and scope of the appended claims.

What is claimed is:

1. An energy-recovering hydraulic drive system for a work vehicle, comprising:
   an internal combustion engine;
   a drive wheel;
   a gas-charged hydraulic fluid accumulator;
   a hydraulic reservoir; and
   a closed loop hydrostatic drive circuit, including a pump, a drive motor, a first conduit, a second conduit and a valve assembly,
   the drive pump being drivingly coupled to the engine and including first and second pump ports, each of the first and second pump ports functioning as both a hydraulic fluid inlet and a hydraulic fluid outlet,
   the drive motor including first and second motor ports, each of the first and second motor ports functioning as both a hydraulic fluid inlet and a hydraulic fluid outlet,
   the drive motor being coupled to the drive wheel to drive the work vehicle over the ground,
   the first conduit being in fluid communication with the first pump port and the first motor port,
   the second conduit being in fluid communication with second pump port and the second motor port, and
   the valve assembly being in selectively changeable between (1) a first configuration in which a first portion of hydraulic fluid leaving the first pump port is directed into the accumulator and simultaneously an amount of hydraulic fluid is directed from the reservoir into the first motor port; and (2) a second configuration in which a second portion of hydraulic fluid leaving the second port of the motor is directed into the reservoir and simultaneously an amount of hydraulic fluid is directed from the accumulator into the second port of the pump.

2. The hydraulic drive system of claim 1, further comprising a charge pump in fluid communication with and coupled between the reservoir and the valve assembly.

3. The hydraulic drive system of claim 2, further comprising a pressure relief valve in fluid communication with and coupled between the reservoir and the valve assembly.

4. The hydraulic drive system of claim 3 wherein the drive pump is a continuously variable displacement pump.

5. The hydraulic drive system of claim 4 further comprising an electronic control circuit and manual operator controls configured to generate signals indicative of a desired vehicle speed and direction of travel, wherein the manual operator controls are coupled to the electronic control circuit to provide signals indicative of the desired direction of travel and the desired speed, wherein the electronic control circuit is coupled to the valve assembly to reconfigure the valve based at least in part upon signals indicative of motion of the vehicle.

6. The hydraulic drive system of claim 5, wherein the signals are provided by the manual operator controls.

7. The hydraulic drive system of claim 6, wherein the valve assembly has a third selectable configuration in which a third portion of hydraulic fluid leaving the second motor port is directed into the accumulator, and a fourth configuration in which a fourth portion of hydraulic fluid is directed from the second pump port into the reservoir.

8. An energy-recovering hydraulic drive system for a work vehicle, comprising:
   an internal combustion engine;
   a drive wheel;
   a gas-charged hydraulic fluid accumulator;
   a hydraulic reservoir; and
   a closed loop hydrostatic drive circuit including a hydraulic pump drivingly coupled to the engine, at least one motor and a valve assembly,
   the pump including a pump high pressure port and a pump low pressure port, the motor including a motor high pressure port and a motor low pressure port, and the valve assembly being selectively configured to direct hydraulic fluid leaving the pump high pressure port into the accumulator to charge the accumulator.

9. The hydraulic drive system of claim 8, wherein the valve assembly is selectively configured to simultaneously direct hydraulic fluid stored in the accumulator into the pump low pressure port and from the motor low pressure port into the reservoir.

10. The hydraulic drive system of claim 8, further comprising a charge pump in fluid communication with and disposed between the reservoir and the valve assembly.

11. The hydraulic drive system of claim 10, wherein the valve assembly is selectively configured to direct hydraulic fluid leaving the charge pump to one of the pump low pressure port and the motor high pressure port.

12. The hydraulic drive system of claim 8, further comprising an electronic control circuit and manual operator controls configured to generate signals indicative of a desired vehicle speed and direction of travel, wherein the manual operator controls are coupled to the electronic control circuit to provide signals indicative of the operator's desired direction of travel and the desired speed, and wherein the electronic control circuit is coupled to the valve assembly to reconfigure the valve based at least in part upon signals indicative of motion of the vehicle.

13. The hydraulic drive system of claim 12, further comprising first and second hydraulic pressure sensors in fluid communication with the hydrostatic drive circuit, wherein the signals are provided at least in part by the first and second hydraulic pressure sensors.

14. The hydraulic drive system of claim 12, wherein the electronic control circuit reconfigures the valve assembly based at least upon the signals indicative of the motion of the vehicle.

15. The hydraulic drive system of claim 8, wherein the valve assembly is selectively configured to direct hydraulic fluid from the reservoir into the motor low pressure port.

16. The hydraulic drive system of claim 8, wherein the valve assembly is selectively configured to simultaneously direct hydraulic fluid leaving the pump high pressure port into the accumulator to charge the accumulator and hydraulic fluid from the reservoir into the motor high pressure port.

* * * * *